United States Patent
Ito (10) Patent No.: US 7,058,774 B2
(45) Date of Patent: Jun. 6, 2006

(54) DATA BACKUP METHOD AND DATA BACKUP SYSTEM

(75) Inventor: Masakazu Ito, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 331 days.

(21) Appl. No.: 10/639,596

(22) Filed: Aug. 13, 2003

(65) Prior Publication Data

US 2004/0034565 A1    Feb. 19, 2004

(30) Foreign Application Priority Data

Aug. 13, 2002   (JP)   ............... 2002-235830

(51) Int. Cl.
   *G06F 12/00* (2006.01)
(52) U.S. Cl. ............ 711/162; 711/154; 705/16
(58) Field of Classification Search ............ 711/162, 711/154, 165; 714/13; 705/16, 21

See application file for complete search history.

(56) References Cited

U.S. PATENT DOCUMENTS

| | | | | |
|---|---|---|---|---|
| 5,812,668 A | * | 9/1998 | Weber | 705/79 |
| 6,032,236 A | * | 2/2000 | Honda | 711/162 |
| 6,085,176 A | * | 7/2000 | Woolston | 705/37 |
| 6,754,704 B1 | * | 6/2004 | Prorock | 709/224 |
| 2003/0131207 A1 | * | 7/2003 | Arakawa et al. | 711/162 |
| 2003/0204576 A1 | * | 10/2003 | Yamada et al. | 709/220 |

FOREIGN PATENT DOCUMENTS

| | | |
|---|---|---|
| JP | 63-118860 A | 5/1988 |
| JP | 10-124377 A | 5/1998 |
| JP | 2000-305831 A | 11/2000 |
| JP | 2001-93047 A | 4/2001 |

* cited by examiner

*Primary Examiner*—Brian R Peugh
(74) *Attorney, Agent, or Firm*—Sughrue Mion, PLLC (57) ABSTRACT

A plurality of POS terminals are divided into a plurality of groups. The POS terminals belonging to the same group hold the same sales information, thus realizing data backup. The division of the POS terminals into groups is variably set.

14 Claims, 6 Drawing Sheets

DATA BACKUP METHOD AND DATA BACKUP SYSTEM

BACKGROUND OF THE INVENTION

1. Field of the Invention

The present invention relates to a data backup method and system applied to a system having a plurality of data processors connected to each other through data transmission lines. For the system to which the present invention is applied, when the data processor is a POS terminal for managing sales registration information, the system serves as a point-of-sale (hereinbelow, referred to as POS) system.

2. Description of the Related Art

In the POS system, data processors disposed in stores and the like are connected to a server having a data totalizing function through transmission lines (communication lines). Sales data (POS data) generated in each data processor is transmitted to the server in real time. The server receives the sales data from the respective data processors and then totalizes the sales data. The server totalizes the sales data every predetermined service day in accordance with the regulation of the store. In some cases, the server manages the sales data and attendance data as master data.

In the POS system having a plurality of POS terminals connected to each other through transmission lines, a master terminal and a backup terminal are arbitrarily or fixedly set in order to back up sales data. The master terminal and the backup terminal store data in common. However, if the master terminal or backup terminal goes down due to a failure, data cannot be recovered. Consequently, in the POS system, the other POS terminals cannot call pending sales data and perform an attendance checking process.

Various proposals have been made in order to solve the abovementioned problems. For example, Japanese Unexamined Patent Application Publication Nos. 63-118860,10-124377, 2000-305831, and 2001-93047 disclose improved methods similar to the following method. According to the method, a plurality of units (POS terminals) having the same functions concurrently execute data processing and accumulation. In other words, data processing and accumulation are distributed and executed through the units. Therefore, if a system goes down, the backup and recovery of data can be ensured.

In the system according to the above method, all of the POS terminals have to share data with each other, namely, store data in common in order to realize the recovery of data. If the data accumulation space of each POS terminal is tight, however, it is difficult to construct the above-mentioned backup system.

On the other hand, in some cases, the style or scale of a store utilizing the POS system, or the style of an organization controlling such stores is changed for reasons of business management. In this case, it is not easy to adapt a data backup function to the above change without changing the fundamental structure of the system.

SUMMARY OF THE INVENTION

Accordingly, it is an object of the present invention to provide a data backup method and system whereby many data processors serving as data recovery sources, which are used at the occurrence of a failure in a system, can be held to increase the reliability of data.

Another object of the present invention is to provide a data backup method and system whereby the necessary data storage capacity of each data processor can be smaller than that of each data processor of a system in which all of data processors, connected to each other via transmission lines, mutually back up data.

Further another object of the present invention is to easily realize the construction of a flexible data backup system in accordance with the circumstances of a store or a location to which the system is applied, and a data storage capacity which can be actually ensured.

A data backup method according to the present invention is applied to a system having a plurality of data processors connected to each other through transmission lines, each data processor including a data processing functional part, a data accumulation functional part, and a data communication functional part.

According to a first aspect of the present invention, the data accumulation functional part stores predetermined processing object data, first data, second data, and third data. The first data indicates a number or code to identify the corresponding data processor. The number or code is assigned to each data processor. The second data indicates a group to which the corresponding data processor belongs. The third data indicates the relationships between the numbers or codes assigned to the respective data processors and at least one of the groups. The data communication functional part recognizes the first to third data. The data communication functional part recognizes the third data stored in the data accumulation functional part, so that the data processors, recognized as belonging to the same group, transmit and receive the stored processing object data to/from each other and store the received processing object data in the respective data accumulation functional parts. The relationships in the third data stored in the data accumulation functional part may be changeable.

A data backup system according to the present invention is also applied to a system having a plurality of data processors connected to each other through transmission lines, each data processor including a data processing functional part, a data accumulation functional part, and a data communication functional part.

According to a second aspect of the present invention, the data accumulation functional part of each data processor stores predetermined processing object data, first data, second data, and third data. The first data indicates a number or code to identify the corresponding data processor. The second data indicates a group to which the corresponding data processor belongs. The third data indicates the relationships between the numbers or codes assigned to the respective data processors and at least one of the groups. The data communication functional part of each data processor recognizes the first to third data. The data communication functional part of each data processor recognizes the third data stored in the data accumulation functional part to identify the data processors belonging to the same group as that of the corresponding data processor. On the basis of a result of the identification, the data processors, identified as belonging to the same group, transmit and receive the stored predetermined processing object data to/from each other. Each of the data processors, identified as belonging to the same group, stores the received predetermined processing object data in the data accumulation functional part thereof.

DESCRIPTION OF THE PREFERRED EMBODIMENTS

A preferred embodiment of a data backup method and system according to the present invention will now be described in detail hereinbelow.

Figure 1:
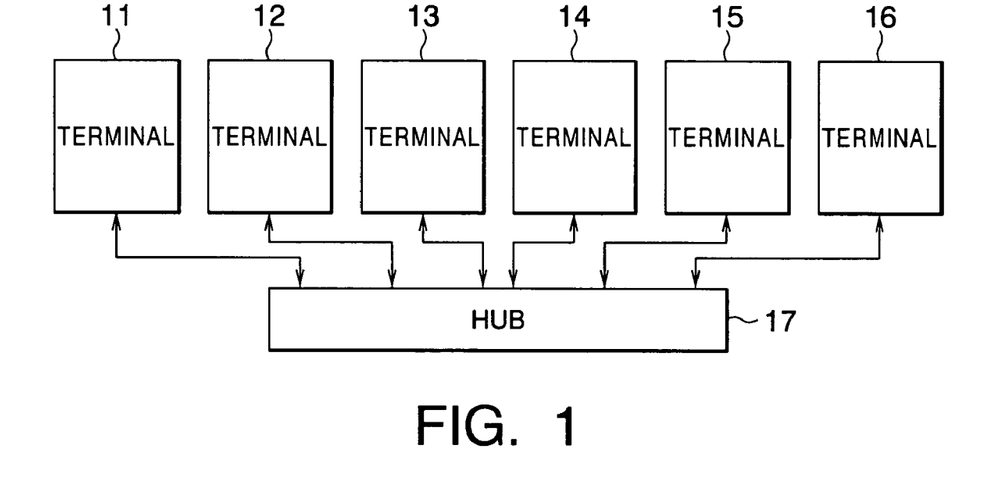
FIG. 1 is a diagram explaining an example of a system to which a data backup method according to the present invention is applied.

FIG. 1 is a conceptual illustration of a system to which the data backup method according to the present invention is applied. In FIG. 1, the present system comprises a plurality of data processors and a hub 17. The data processors are connected to each other via the hub 17 on a local area network (hereinbelow, referred to as a LAN). In the present embodiment, six POS terminals 11, 12, 13, 14, 15, and 16 function as the data processors, respectively.

The POS terminals 11 to 16 connected to each other on the LAN are divided into a plurality of groups. Data such as itemized sales data or attendance data which requires backup is held as common data by each of the POS terminals belonging to the same group on the LAN. Consequently, if a failure occurs in any POS terminal, data can be easily recovered with reliability.

As described hereinbelow, according to the present embodiment, the POS terminals 11 to 16 have similar construction and functions.

Figure 2:
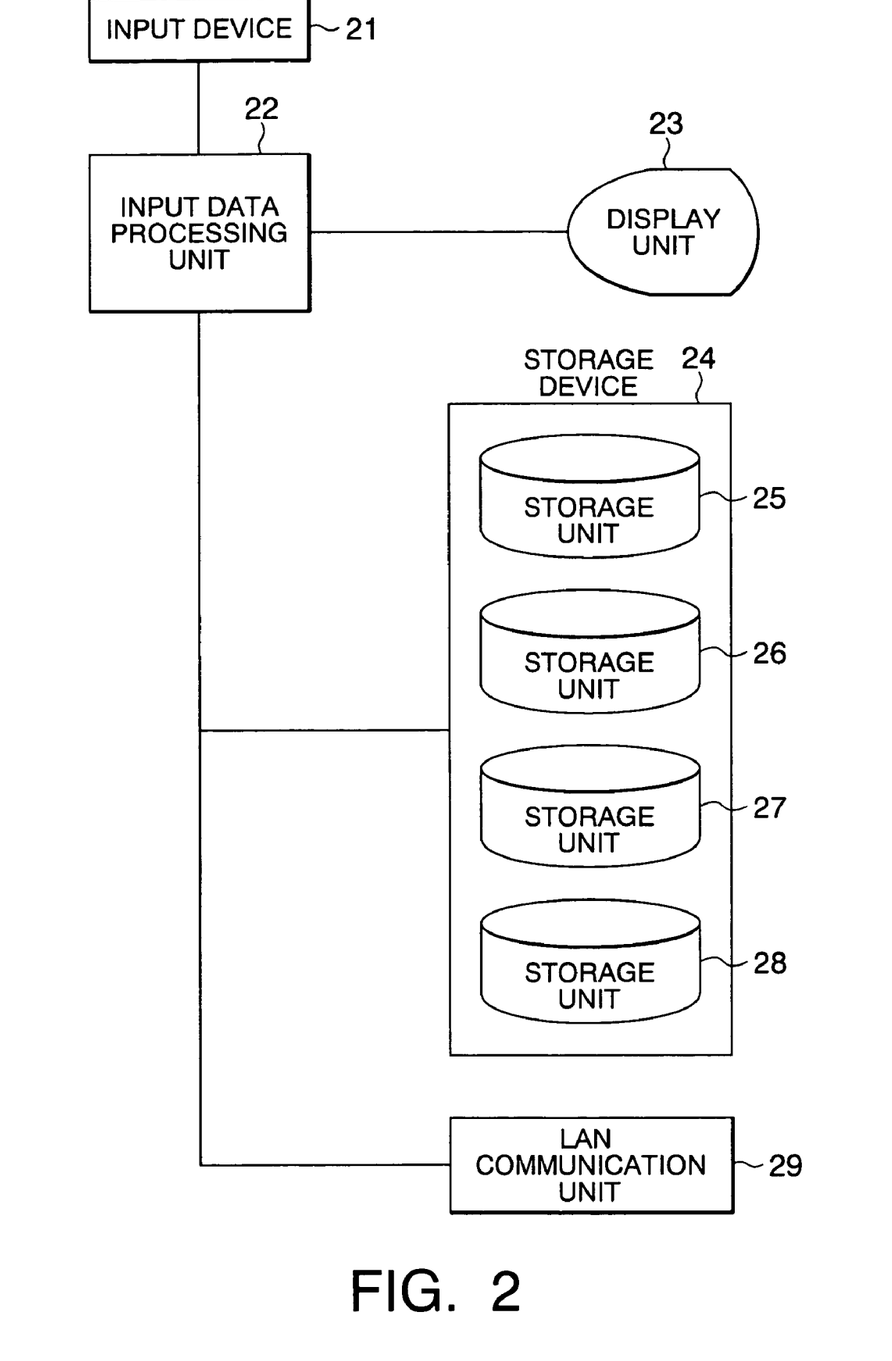
FIG. 2 is a block diagram of the structure of each POS terminal shown in FIG. 1.

FIG. 2 is a block diagram of the construction of each POS terminal shown in FIG. 1. The POS terminals 11 to 16 have the same construction. Referring to FIG. 2, each POS terminal (data processor) comprises: an input device 21 used in data entry and menu registration; an input data processing unit 22 serving as a data processing functional part; a display unit 23; a storage device 24 serving as a data accumulation functional part; and a LAN communication unit 29 serving as a data communication functional part.

The input data processing unit 22 processes data which is supplied from the input device 21. The display unit 23 displays the data supplied from the input device 21 or processed data on the basis of an output of the input data processing unit 22. The storage unit 24 stores the data supplied from the input device 21, the processed data, and other data, which will be described later, on the basis of the output of the input data processing unit 22. The LAN communication unit 29 communicates with the other POS terminals. The storage device 24 comprises a plurality of storage units 25, 26, 27, and 28.

Figure 3:
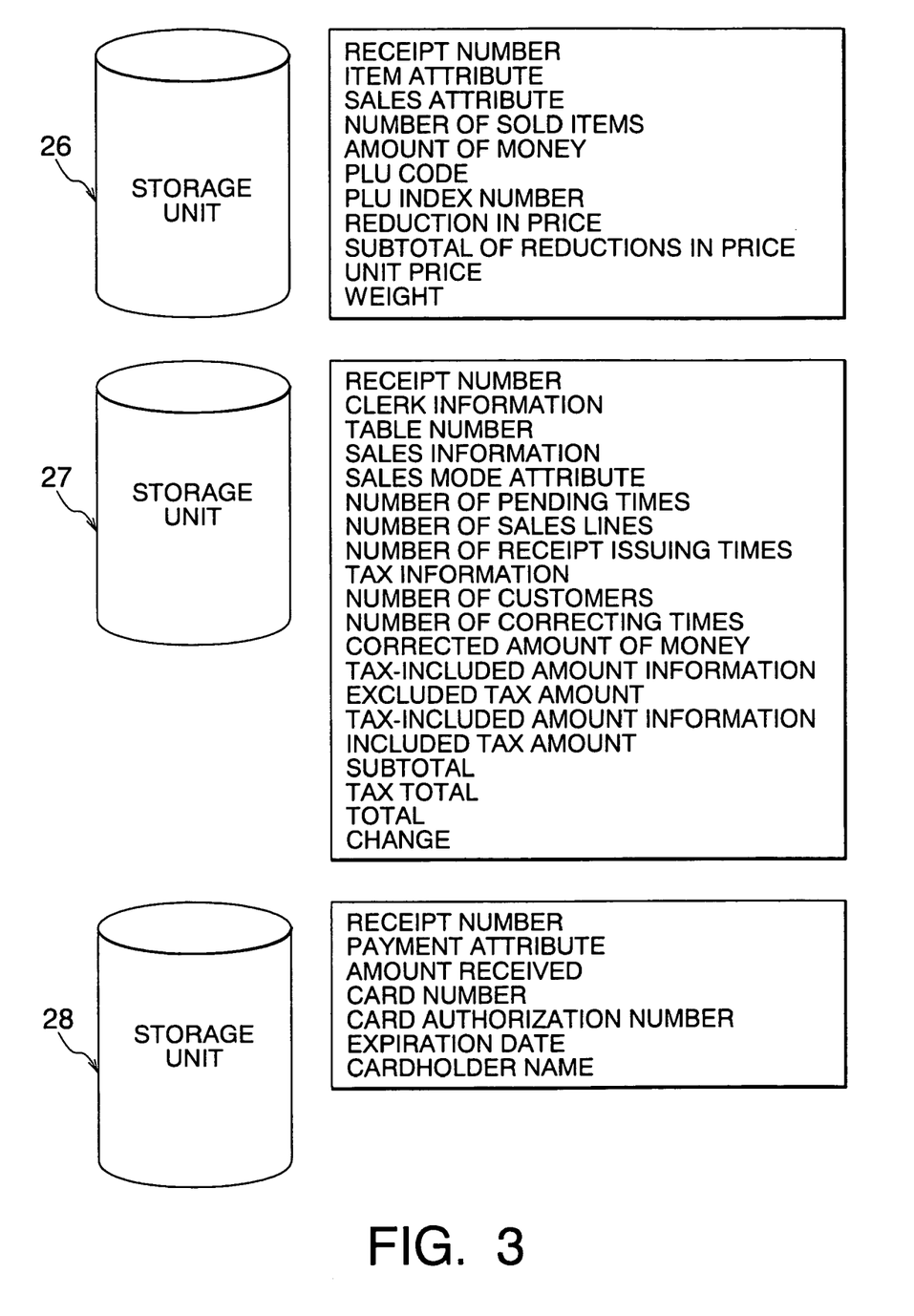
FIG. 3 is a diagram of the details of accumulated data in respective storage units of a storage device of the POS terminal shown in FIG. 2.

FIG. 3 is a diagram showing the details of data accumulated in the storage units 26, 27, and 28 of the storage device 24. In the respective storage units 26, 27, and 28 of the storage device 24, the data supplied from the input device 21 and the processed data are accumulated as mentioned above. Data obtained through the LAN communication unit 29 is also accumulated in the respective storage units 26 to 28.

In addition to the above storage units 26 to 28 for accumulating the above-mentioned data, the storage device 24 has the storage unit 25 for storing three kinds of data, namely, first to third data, which will be described later. Data accumulated in the storage units 26 to 28 includes data to be processed or accumulated, namely, processing object data. The first data indicates a number or code to identify the corresponding POS terminal. For example, the first data indicates a terminal number, which will be described later. The second data indicates a group which the corresponding POS terminal belongs to. For example, the second data indicates a group number which will be described later. The third data indicates the relationship between the number or code assigned to the corresponding POS terminal and the corresponding group and the relationships between the other POS terminals and the respective groups. For example, the third data indicates combinations of the terminal numbers and the corresponding group numbers. The LAN communication unit 29 can recognize the first to third data. At least the third data can be variably set. The first to third data will be described with reference to FIGS. 4A and 4B.

Figure 4A:
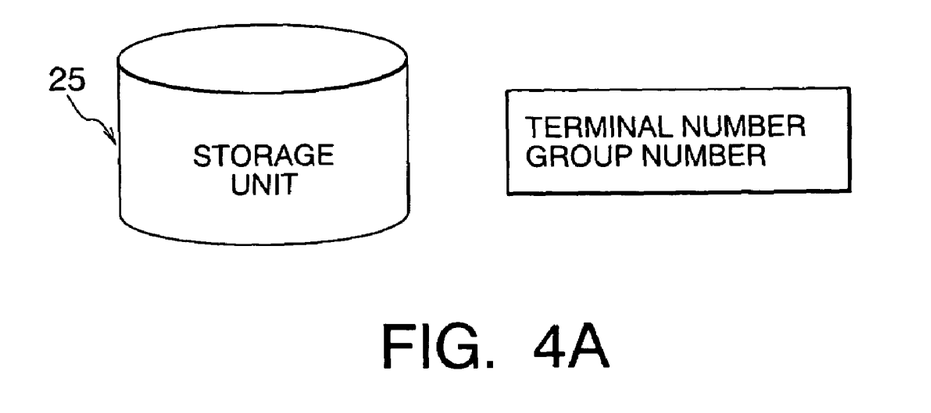
FIGS. 4A and 4B are diagrams each showing an example of data accumulated in a specific storage unit in the storage device of the POS terminal shown in FIG. 2.
Figure 4B:
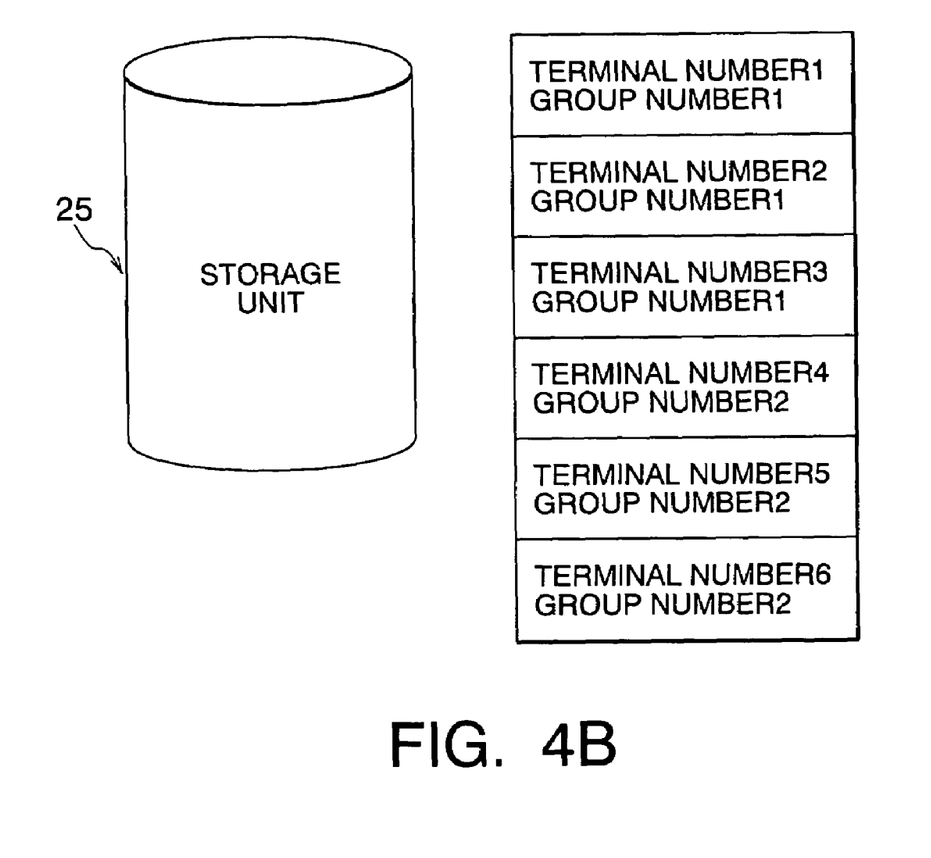

FIGS. 4A and 4B show data stored in the storage unit 25 of the storage device 24. As shown in FIG. 4A, the terminal number assigned to the corresponding POS terminal is stored as first data in a portion of the storage unit 25. The group number to which the corresponding POS terminal belongs is stored as second data in the same portion. Referring to FIG. 4B, the combinations of the terminal numbers and the corresponding group numbers are stored as third data in the other portion of the storage unit 25.

In FIG. 4A, for generally shown data indicating a terminal number, in the case of the POS terminal 11, data indicates a terminal number 1. In the case of the POS terminal 12, data indicates a terminal number 2. Similarly, terminal numbers 3 to 6 are assigned to the POS terminals 13 to 16, respectively. Codes can also be assigned to the terminals instead of the numbers. In FIG. 4B, the POS terminals 11 to 16 are divided into two groups. The POS terminals 11, 12, and 13 (terminal numbers 1, 2, and 3) belong to a group 1. The POS terminals 14, 15, and 16 (terminal numbers 4, 5, and 6) belong to a group 2.

As mentioned above, according to the present embodiment, a natural number is used as second data indicating a group to which the corresponding POS terminal belongs. For the third data indicating the combination of the terminal number assigned to the corresponding POS terminal and the group number and the combinations of the terminal numbers assigned to the other POS terminals and the group numbers, the combinations can be changed as necessary.

Figure 5:
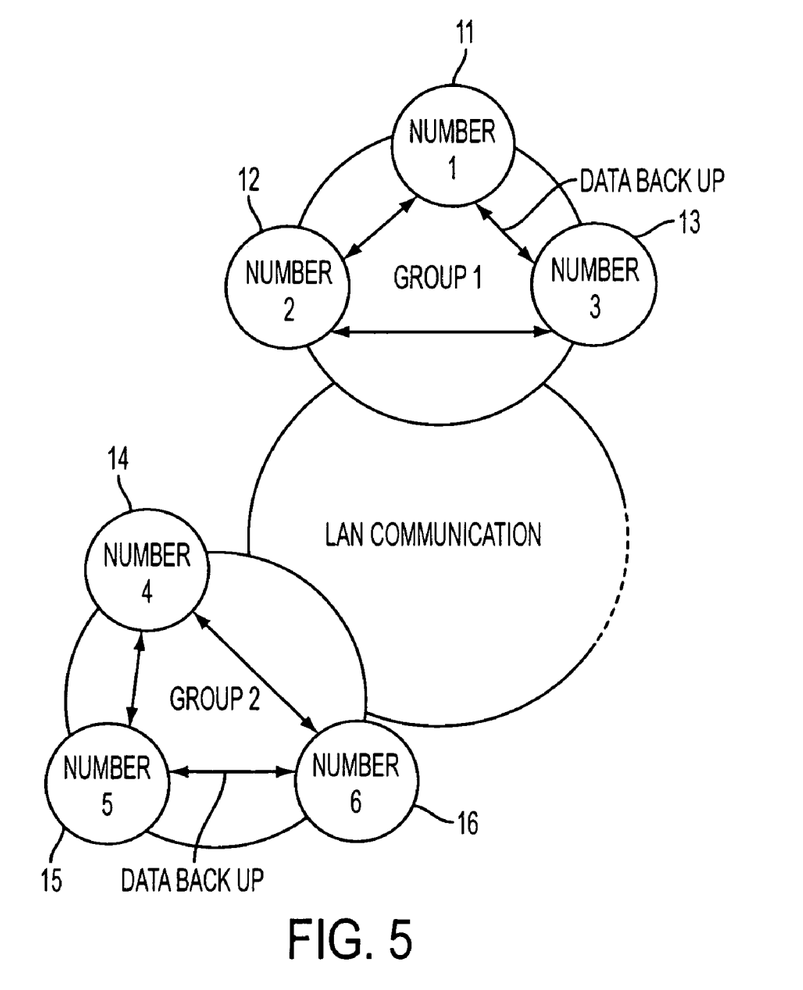
FIG. 5 shows the mutual relation among the terminals illustrated in FIG. 1.

FIG. 5 shows the mutual relation described above among the terminals 11–16 illustrated in FIG. 1. As previously mentioned, terminals 11–13 having the terminal numbers 1–3 belong the group number 1, while the terminals 14–16. having the terminal numbers 4–6 belong the group 2. The terminals 11–13 of the group number 1 and the terminals 14–16 of the group number 2 are connected through a LAN. Basically, the backup of data such as itemized sales data or attendance data are carried out among the terminals with the same group number.

Figure 6:
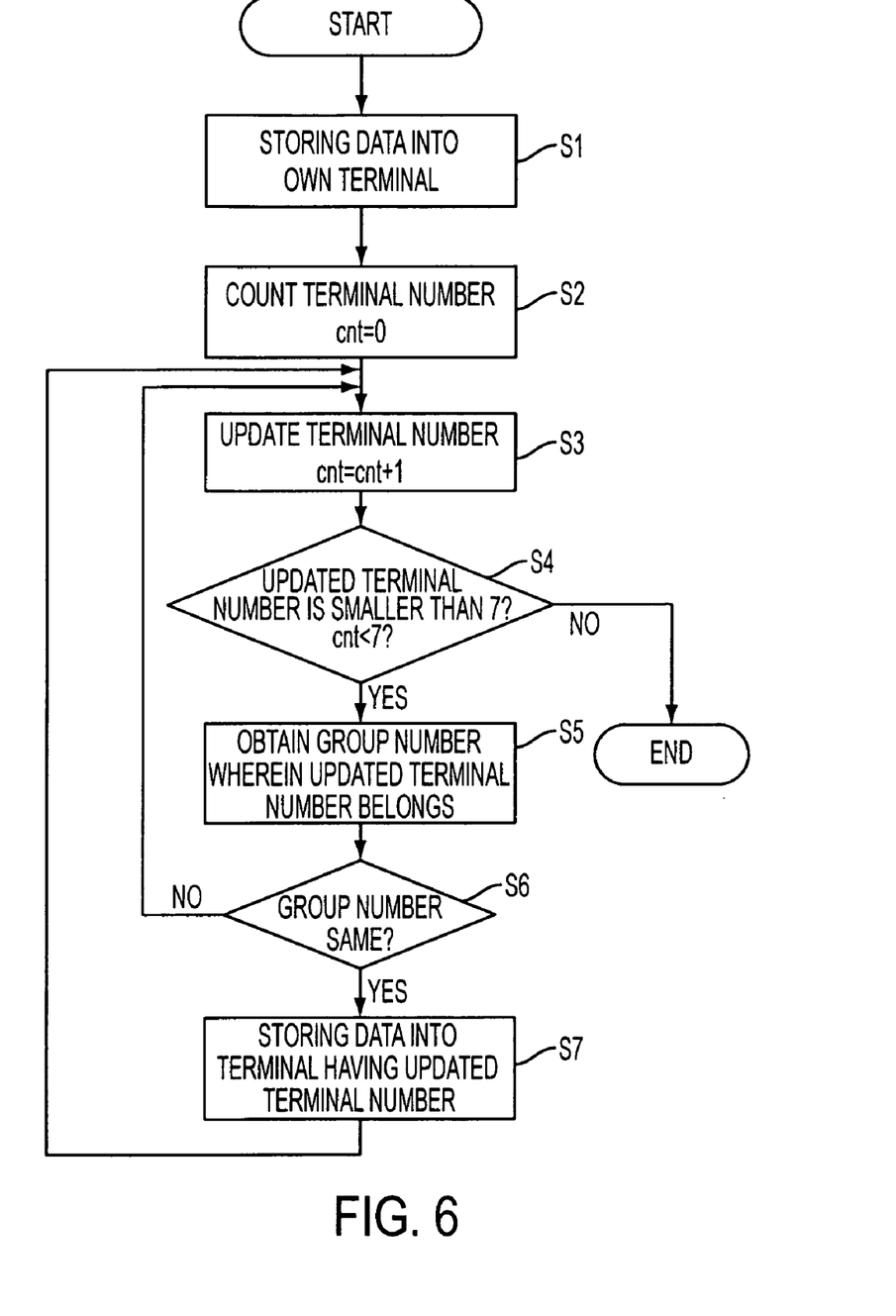
FIG. 6 is a flow chart for the data backup operation of the present invention.

A data backup method will now be described hereinbelow with reference to FIG. 6. For example, after the POS terminal 11 terminates a sales registration process (S1), the LAN communication unit 29 retrieves the third data in the storage unit 25 to determine the POS terminals having the same group number as that of the POS terminal 11, in which the sales registration process has been performed (S2, S3, S4, S5). According to the present embodiment, it is determined that the POS terminals 12 and 13 have the same group number as that of the POS terminal 11 (S6). In this case, the LAN communication unit 29 of the POS terminal 11 transmits sales information stored in the storage units 26 to 28 to the POS terminals 12 and 13. Each of the POS terminals 12 and 13 stores the received sales information in the storage units 26 to 28 of the storage device 24 (S7). Consequently, for the POS terminals connected to each other on the LAN, the respective POS terminals having the same group number hold the same data contents of the storage units 26 to 28 in the respective storage devices 24. Thus, the data in the storage units 26 to 28 can be backed up.

On the other hand, when the POS terminal 15 performs sales registration, sales information is transmitted to the POS terminals 14 and 16 having the same group number as that of the POS terminal 15 in a manner similar to the above. Each of the POS terminals 14 and 16 stores the received sales information in the storage units 26 to 28 of the storage device 24. Consequently, the data of the storage units 26 to 28 can be backed up.

According to the present invention, when zero is used as a group number, the system can also be constructed as follows. When a POS terminal having a group number 0 executes a sales registration process, the LAN communication unit 29 thereof recognizes third data. When recognizing that the POS terminal having the group number 0 does not belong to any group, the LAN communication unit 29 does not transmit data stored in the storage units 26 to 28 to any POS terminal and does not receive data from any POS terminal.

As mentioned above, the POS terminals having the same group number hold the same sales information among the POS terminals connected to each other on the LAN. Consequently, if a failure occurs in a specific POS terminal, data can be easily recovered with reliability because the other POS terminals of the same group hold the same sales information.

For the POS terminals serving as data sources to be used for data recovery at the occurrence of a failure, the number of POS terminals can be larger than that of a system having one master terminal and one backup terminal.

Further, since each POS terminal holds only the same data as that of the POS terminals having the same group number as its own group number, the storage capacity of each POS terminal can be smaller than that of a system in which all of POS terminals mutually back up data.

In a store utilizing the data backup method or data backup system according to the present invention, when the group number of each POS terminal is changed, a flexible backup system best-suited to the operation of the store can be easily constructed. Thus, a POS system suitable for wide-area store management can be constructed. Further, various backup systems can be constructed in accordance with the storage capacity of a POS terminal according to specifications which can be actually applied.

When a POS system has sufficient storage capacity, the same group number is assigned to all of POS terminals. Thus, sales information can be backed up in all of the POS terminals on a LAN. In this case, the following construction can also be used. That is, when sales registration is performed in a POS terminal having a group number 0, the POS terminal having the group number 0 does not transmit sales information to any POS terminal and does not receive data from any POS terminal. Consequently, the storage contents of the storage units 26 to 28 of the POS terminal having the group number 0 include only data of the present POS terminal in which the sales registration has been performed.

The present invention has been described with respect to the case where the present invention was applied to the POS system comprising the POS terminals. The present invention is not limited to the POS system. The present invention can also be applied to a general network system in which a plurality of data processors are connected to each other through transmission lines. In this case, the present invention is applied to the general network system as follows.

Each data processor stores processing object data in the data accumulation functional part thereof. In any of the data processors, when at least one predetermined kind of data included in processing object data is updated, the data communication functional part of the relevant data processor recognizes third data stored in the data accumulation functional part. Thus, updated data is transmitted from the data processor having the updated data to all of the data processors which are recognized as belonging to the same group through the transmission lines. Each of the data processors belonging to the same group receives the updated data and then updates data stored in the data accumulation functional part thereof on the basis of the updated data. Due to the updating, all of the data processors belonging to the same group hold the same content of at least the predetermined kind of data in the respective data accumulation functional parts.

What is claimed is:

1. A data backup method used in a system having a plurality of data processors connected to each other through transmission lines, each data processor comprising a data processing functional part, a data accumulation functional part, and a data communication functional part, wherein
   the data accumulation functional part stores predetermined processing object data, first data, second data, and third data, the first data indicating a number or code to identify the corresponding data processor, the number or code being assigned to each data processor, the second data indicating a group to which the corresponding data processor belongs, the third data indicating the relationships between the numbers or codes assigned to the respective data processors and at least one of the groups,
   the data communication functional part recognizes the first to third data, and
   the data communication functional part recognizes the third data stored in the data accumulation functional part, so that the data processors, recognized as belonging to the same group, transmit and receive the stored processing object data to/from each other and store the received processing object data in the respective data accumulation functional parts.

2. The method according to claim 1, wherein
   when at least one predetermined kind of data included in the processing object data stored in the data accumulation functional part is updated in any of the data processors, the data communication functional part of the relevant data processor recognizes the third data stored in the data accumulation functional part thereof to transmit the updated data to all of the data processors, recognized as belonging to the same group as that of the relevant data processor, through the transmission lines,
   each of the data processors, which receive the updated data through the transmission lines, updates data stored in the data accumulation functional part on the basis of the updated data, and
   all of the data processors, recognized as belonging to the same group, hold the same content of the predetermined kind of data due to the updating.

3. The method according to claim 1, wherein the relationships in the third data stored in the data accumulation functional part is changeable.

4. The method according to claim 2, wherein
the data communication functional part recognizes the third data stored in the data accumulation functional part to determine which group the corresponding data processor belongs to, and
when data is updated in the corresponding data processor, so long as it is determined that the corresponding data processor does not belong to any group, the corresponding data processor does not transmit the updated data to any data processors.

5. The method according to claim 2, wherein
the data communication functional part recognizes the third data stored in the data accumulation functional part to determine which group the corresponding data processor belongs to, and
when it is determined that the corresponding data processor does not belong to any group, updated data in the corresponding data processor is not received by any data processors.

6. The method according to claim 1, wherein a natural number is assigned as the second data stored in the data accumulation functional part of each data processor.

7. The method according to claim 4, wherein zero is assigned as the second data to the data processor which does not belong to any group.

8. The method according to claim 5, wherein zero is assigned as the second data to the data processor which does not belong to any group.

9. A data backup system having a plurality of data processors connected to each other through transmission lines, each data processor comprising a data processing functional part, a data accumulation functional part, and a data communication functional part, wherein
the data accumulation functional part of each data processor stores predetermined processing object data, first data, second data, and third data, the first data indicating a number or code to identify the corresponding data processor, the second data indicating a group to which the corresponding data processor belongs, the third data indicating the relationships between the numbers or codes assigned to the respective data processors and at least one of the groups,
the data communication functional part of each data processor recognizes the first to third data,
the data communication functional part of each data processor recognizes the third data stored in the data accumulation functional part to identify the data processors belonging to the same group as that of the corresponding data processor,
the data processors, identified as belonging to the same group, transmit and receive the stored predetermined processing object data to/from each other, and
each of the data processors, identified as belonging to the same group, stores the received predetermined processing object data in the data accumulation functional part.

10. The system according to claim 9, wherein
in each data processor, when at least one predetermined kind of data included in the predetermined processing object data stored in the data accumulation functional part is updated, the data communication functional part recognizes the third data stored in the data accumulation functional part to transmit the updated data to all of the data processors, recognized as belonging to the same group as that of the relevant data processor having the updated data, through the transmission lines.

11. The system according to claim 10, wherein each of the data processors, which receive the updated data through the transmission lines, updates data stored in the data accumulation functional part on the basis of the updated data, so that all of the data processors, recognized as belonging to the same group, hold the same content of the predetermined kind of data due to the updating.

12. The system according to claim 10, wherein
in each data processor, the data communication functional part recognizes the third data stored in the data accumulation functional part to determine which group the corresponding data processor belongs to, and
when data is updated in the corresponding data processor, so long as the corresponding data processor does not belong to any group, the corresponding data processor does not transmit the updated data to any data processors.

13. The system according to claim 10, wherein
in each data processor, the data communication functional part recognizes the third data stored in the data accumulation functional part to determine which group the corresponding data processor belongs to, and
when it is determined that the corresponding data processor does not belong to any group, updated data in the corresponding data processor is not received by any data processors.

14. The system according to claim 9, wherein each data processor includes a POS terminal.

* * * * *